UNITED STATES PATENT OFFICE.

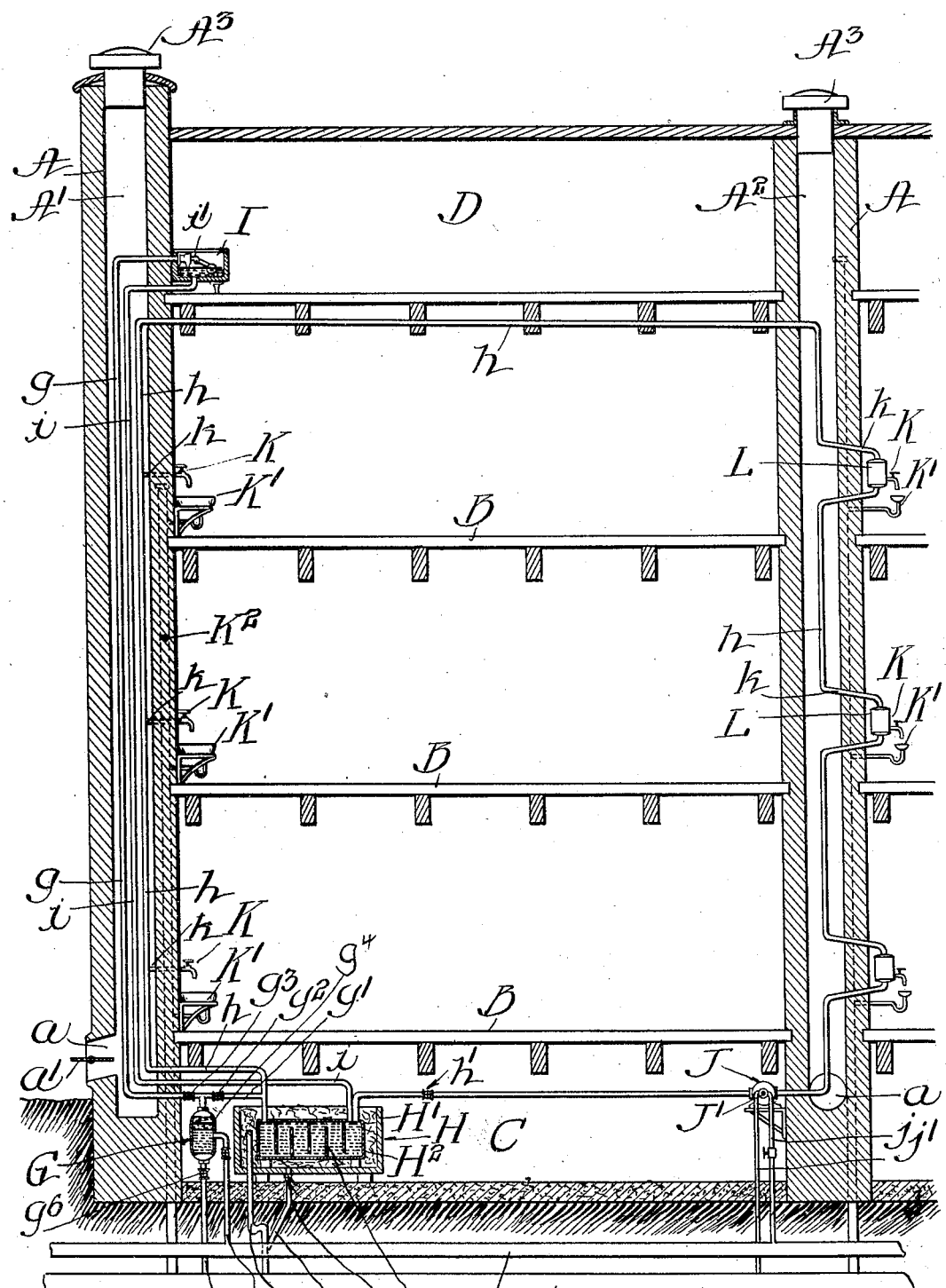

GEORGE FLEMING, OF CHICAGO, ILLINOIS.

SYSTEM FOR SUPPLYING AND DISTRIBUTING DRINKING-WATER.

No. 920,559.  Specification of Letters Patent.  Patented May 4, 1909.

Application filed September 21, 1907. Serial No. 393,896.

*To all whom it may concern:*

Be it known that I, GEORGE FLEMING, a citizen of the United States, and a resident of Chicago, in the county of Cook and State of Illinois, have invented certain new and useful Improvements in Systems for Supplying and Distributing Drinking-Water; and I do hereby declare that the following is a full, clear, and exact description thereof, reference being had to the accompanying drawings, and to the letters of reference marked thereon, which form a part of this specification.

This invention relates to an improved system for distributing drinking or other water, which may be cooled and filtered, to the different parts of a building and the invention consists in the matters hereinafter set forth and more particularly pointed out in the appended claims.

The invention may be better understood by reference to the accompanying drawing which shows a vertical section through the walls and floors of a building equipped with my improved water distributing system.

As shown in said drawing, A, A designate two vertical walls of a building, either of which may be an outer wall or one of the partition walls separating one part of the building from another, and B, B designate the several floors of the building.

C designates the basement of the building and D designates an upper compartment which may constitute the attic of the building.

The two walls A, A are provided with vertical passages or flues $A^1$, $A^2$ in which are located parts of the apparatus to be hereinafter described. Said flues are equipped at their upper ends with ventilators $A^3$ and are provided at their lower ends with air inlet openings $a$ which may be provided with valves $a^1$, shown at the lower end of the flue $A^1$.

E designates a water supply main and F a sewer main below the floor of the basement.

G designates a filtering device, H a refrigerator cooling device located in the basement of the building, and I designates a water supply tank located in the attic D. From the water supply main E a pipe $e$ leads to the filter G and from thence a pipe $g$ leads through the flue $A^1$ to the water distributing tank I. The outlet end of the pipe $g$ is equipped with a float controlled valve $i^1$ which operates to maintain a uniform level of water in said distributing tank. From the tank I a pipe $i$ leads downward through said flue $A^1$ into one end of the refrigerator box H and from the opposite end of said box a pipe $h$ leads upwardly through said flue $A^1$ to the upper part of the building, thence across to the opposite flue $A^2$ and descends through said flue to the basement and enters the refrigerator box H at a point closely adjacent to the lower end of the pipe $i$. At various points in its length the pipe $h$ is provided with branch pipes $k$ and draw-off cocks K K by means of which water may be drawn from the system as required for use. The pipe $h$ and the cooling space of the refrigerator H constitute a closed circuit to which water is supplied through the medium of the float controlled valve and distributing tank, the latter maintaining the circulating system constantly filled. Below said draw-off cocks are arranged small drip bowls or sinks $K^1$ provided with trapped drain pipes which lead into waste pipes $K^2$ which connect at their lower ends with the sewer main F. Certain of the branch pipes $k$ are shown as equipped with ornamental glass tanks L located in the adjacent rooms of the building which are provided with the draw-off cocks K and with the drip cups $K^1$ leading to the waste pipe $K^2$.

J designates a circulating pump contained in the circulating pipe $h$ for the purpose of maintaining a circulation of water through the distributing circuit and through the refrigerator to keep the water cool and drinkable. Said pump is herein shown as contained in the horizontal portion of the pipe located in the basement C. The pump may be conveniently driven by a water motor $J^1$ supplied with water from the main E through a pipe $j$. A drain pipe $j^1$ leads from the motor to the sewer.

The system may be employed to distribute water which is not cooled by passing through the refrigerating device H as, for example, in winter when the water is sufficiently cool as not to require artificial refrigeration. For this purpose a branch pipe $g^1$, provided with a valve $g^2$, leads from the upper part of the filter G directly to the pipe $h$, and the pipe $g$ is provided with a valve $g^3$. Thus by opening said valve $g^2$ and closing the valve $g^3$ water enters the pipe $h$ without passing through the refrigerating device. When the system is so used the water does not find its way to the automatic filling tank I but passes directly to the draw-off cock equipped distributing pipe h. The horizontal portion of the distributing pipe h in the basement is provided with a valve $h^1$ which is closed when the water passes directly from the filter to the pipe h to prevent flooding of the tank I through the pipe i.

The refrigerating box or cooling device H consists of an outer casing $H^1$ adapted to receive ice and an inner closed chamber or tank $H^2$ suitably supported therein and arranged for the passage of water therethrough. Said inner chamber $H^2$ is divided by vertical partitions $h^2$ into a number of compartments and said partitions $h^2$ are so arranged that alternate ones leave spaces between their top and bottom margins and the top and bottom walls, respectively, of the tank, so that water entering the tank through the top of one of the end compartments passes to the other end of the device in a zigzag path through said device, and finally into the receiving end of the distributing pipe h. A drain pipe $h^4$ communicating with the sewer pipe F opens into the ice compartment of the refrigerating box at a point above the bottom wall thereof, whereby water from the melting ice is drained to the level of the upper end of said pipe. A second drain pipe $h^4$, provided with a valve $h^5$, opens into said ice compartment at the bottom thereof whereby when desired all the water may be drained off.

The filtering device G consists of an upright cylindric tank having in its upper part horizontally arranged porous partitions $g^4$ between which are placed a filtering medium, as sand, gravel or charcoal, and having an inlet opening immediately below the lowermost of said partitions with which the filter inlet pipe e communicates. It has an outlet opening at the top of the tank for communication with the pipes g and $g^1$. From the bottom of the tank G a drain pipe $g^5$ leads to the sewer pipe F. Said drain pipe is provided with a valve $g^6$ which is normally closed. The practical advantage of such a construction lies in the fact that dirt, sediment and impurities which are separated from the water by its passage through the lowest of the horizontal partitions, or the first layer of filtering media, instead of remaining in contact with said partition is continually washed therefrom by the inflow of water through the inlet opening and settles at the bottom of the filtering tank from which it may be occasionally withdrawn by opening the valve $g^6$ in the drain pipe $g^5$.

In the usual operation of the system the valve $g^2$ is closed and the valve $g^3$ is open. Water passes by the pressure of the supply system, of which the pipe E forms a part, through the filter and the pipe g to the controlling tank I and from thence passes through the pipe i to the inner tank $H^2$ of the refrigerator H from which it flows through the distributing pipe h until the system is filled to a predetermined level in the distributing tank or box I, whereupon the float controlled valve $i^1$ closes and admits no further supply of water to the system until water has been drawn therefrom through one of the draw-off cocks K. Thereafter water is admitted to the system to the level determined by the valve $i^1$. Thus the controlling tank and its valve constitutes means for automatically filling and maintaining the system filled with water, while avoiding the full pressure of the supply system being exerted on the distributing system and its draw-off cocks. After this system is filled the circulating pump is set in operation to maintain a circulation of water in the closed system of pipes including the distributing pipe h and the refrigerator, thus preventing the water from becoming stagnant or dead in the system and keeping it cool by its passage through the refrigerator.

I claim as my invention:—

1. In a system for supplying water, the combination with a water supply main, and a closed water distributing circuit communicating with said main and provided with a plurality of draw-off cocks, of a pump for maintaining a circulation of water in said closed circuit, and a water motor communicating with, and operated by the pressure of, the water supply main for actuating said pump.

2. In a system for supplying water, the combination with a source supplying water under pressure, a tank located at the upper level of the system which receives water from the source of supply, and a refrigerator located at the lower level of the system, of a closed distributing circuit, including said refrigerator, said circuit embracing a system of piping the receiving end of which leads from one end of the refrigerator and the return end of which enters the other end thereof, a pipe leading from said tank to the end of the refrigerator adjacent to the return end of said system of piping for supplying water to said closed circuit, and a float controlled valve in said tank for controlling the supply of water to said circuit.

3. In a system for supplying water, the combination with a source supplying water under pressure, a tank located at the upper level of the system which receives water from the source of supply, and a refrigerator located at the lower level of the system, of a closed distributing circuit, including said refrigerator, said circuit embracing a system of piping the receiving end of which leads from one end of the refrigerator and the return end of which enters the other end thereof, a pipe leading from said tank to the end of the refrigerator adjacent to the return end of said system of piping for supplying water to said closed circuit, a float controlled valve in said tank for controlling the supply of water to said circuit, and means for positively maintaining circulation of water through said circuit.

In testimony, that I claim the foregoing as my invention I affix my signature in the presence of two witnesses, this 12th day of September A. D. 1907.

GEORGE FLEMING.

Witnesses:
A. M. BUNN,
T. H. ALFREDS.